Figure 1:
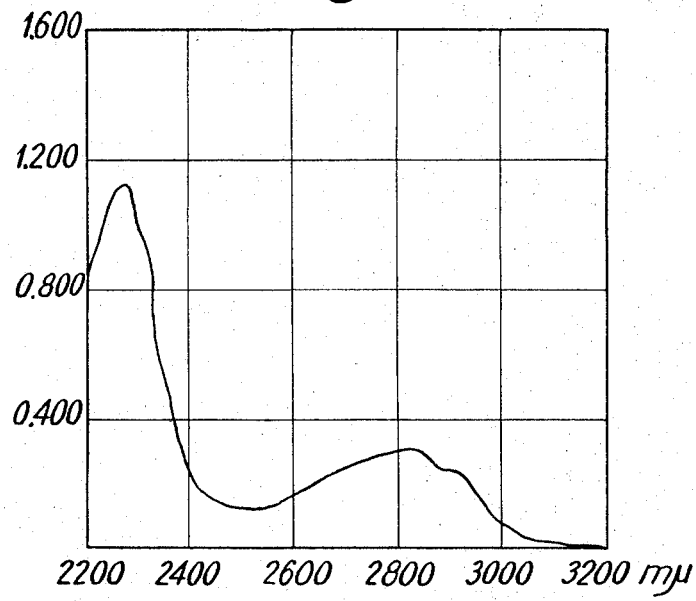

United States Patent Office 3,367,835
Patented Feb. 6, 1968

3,367,835
PROCESS FOR THE PREPARATION OF
CHYMOTRYPSIN B
Yvonne Thuillier, Paris, France, assignor to Laboratoires
Albert Rolland, Paris, France, a French society
Filed Oct. 12, 1964, Ser. No. 403,409
Claims priority, application Great Britain, Oct. 11, 1963,
40,297/63
4 Claims. (Cl. 167—75)

This invention relates to a process for the preparation of chymotrypsin B and to the product thus obtained which is distinguished by its purity, and to pharmaceutical compositions containing the product.

It is known that chymotrypsin B is a pancreatic enzyme which differs from alpha-chymotrypsin. Thus, when alpha-chymotrypsinogen is activated with trypsin there is obtained alpha-, beta-, delta- and gamma-chymotrypsins, which are enzymes having very similar constitutions. Their isoelectric points are of the order of 8.5 and they possess the same terminal group. They differentiate only by a more or less large opening between parts of the chain units. On the other hand, when chymotrypsinogen B is activated with trypsin, according to the same activation process, chymotrypsin B is obtained, whose isoelectric point is 4.7. Hitherto, the first group of chymotrypsins have been more readily obtained than the chymotrypsin B because of difficulties in purification of the latter which has consequently been much less studied.

According to the invention we have devised a process in which chymotrypsin B can be obtained in a pure form. In the process there is employed a pancreatic extract prepared by acid hydrolysis, for example with 5 N sulphuric acid. The product thus obtained is filtered and then treated with an ammonium sulphate solution in a concentration between 15% and 25% based on the total volume of the liquid. There is thus formed a precipitate containing impurities which is removed by filtration and the filtrate is taken up and treated with a further quantity of ammonium sulphate solution equal to the first, whereby the final ammonium sulphate concentration based on the total liquid is brought to a value between 35% and 45%, preferably about 40%.

The ammonium sulphate concentration is particularly critical in this stage of the process, because it is possible to separate from the pancreatic extract various enzymes, trypsin, alpha-chymotrypsin, chymotrypsin B and elastase corresponding to various predetermined values of the ammonium sulphate concentration. It is thus absolutely necessary, in order to obtain chymotrypsin B in a pure form, to conform to the above indicated values in order to approach as closely as possible the value of 40% in the last stage of the extraction.

After this treatment, some of the proteins, notably chymotrypsinogen B, precipitate (A) and are removed by filtration. The precipitate (A) containing chymotrypsinogen B referred to above is taken up in de-ionised water. The solution of proteins is demineralized, for example by chromatography on carboxymethyl cellulose buffered with citrate to pH 3.8. The solution of proteins which is passed through the chromatograph column is also buffered to same pH 3.8; thus chymotrypsin B is fixed and the column is then washed with the same buffer solution to remove the inert proteins, and the product is eluted with an acetate buffer at a pH of 4.6. Chymotrypsinogen B separates under these conditions and this procedure can be followed by measurements with the spectrophotometer.

The elute solution obtained after the separation of the chymotrypsinogen B is precipitated with the aid of ammonium sulphate in order to concentrate the proteins. The precipitate is redissolved in a minimum of water and activated at pH 7.8 with trypsin, preferably in the presence of calcium ions.

The product is demineralized and chromatographed on carboxymethyl cellulose under the same conditions as before in order to remove any trypsin impurities which may have remained in the solution. Finally the product is centrifuged and lyophilised. The process, from the treatment of the pancreatic extract to the final purification, is preferably carried out at low temperature, especially about $-2°$ C.

Using the process of the invention, it has been found possible to isolate chymotrypsin B which has an isoelectric point of $4.7 \pm 0.5$, is soluble in water to a concentrations of 10% and insoluble in acetone, alcohol and ether.

Figure 2:
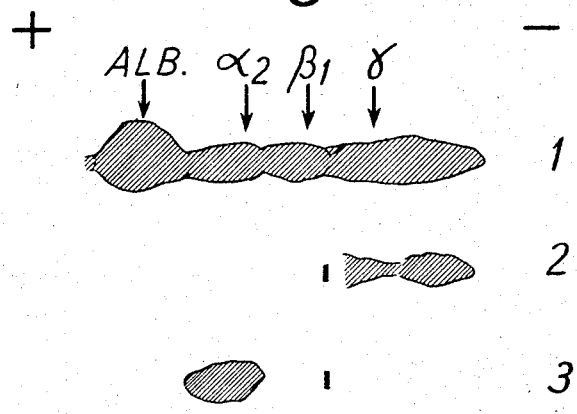

A test was made by microelectrophoresis on Scheidegger agar plates buffered to pH 8.2. The migration time was 1 hour 20 minutes under 4 volts/cm.$^2$. The results are shown on the sketch of FIG. 2 of the attached drawings, in which (1) represents the normal human serum used as control, (2) represents alpha-chymotrypsin, (3) represents chymotrypsin B according to the invention, alb. represents albumin and $\alpha_2$, $\beta_1$ and $\gamma$ represent the respective globulins of normal human serum. A protein stain was thus observed, which was evidence of the purity of the product, and differed very distinctly from those of trypsin and alpha-chymotrypsin.

The percentage of proteins of a solution of the product containing 200 microgrammes per square centimeter in N/1000 hydrochloric acid was measured by the optical density at 2,800 A. There was obtained $$\frac{0.400 \times 10}{0.215}$$

i.e. 18.6 mg. per 20 mg.

The ultra-violet absorption spectrum of the product of the invention was established using a solution of concentration of 200 microgrammes per cc. in N/1000 hydrochloric acid. The spectrum thus obtained is shown on FIG. 1 of the accompanying drawing where peaks reaching 2,300 and 2,800 A. can be seen.

There was then studied the specific activity of the product of the invention, which may be determined as the quantity of micro-molecules of acetyltyrosin ethyl ester which can be hydrolysed in 1 minute by 1 mg. of chymotrypsin B. This enzymatic hydrolysis is carried at a constant temperature of 25° C.

To a solution of chymotrypsin B in a concentration of 20 mg./cc. there was added 8 cc. of trihydroxymethylaminomethane buffer so that the pH was brought to 8, and the substrate was then added.

The speed of hydrolysis was measured and plotted as a function of the quantity of N/10 sodium hydroxide employed to maintain the pH exactly at 7.9. It was found that 0.0725 cc. per minute of N/10 sodium hydroxide was required for a solution of 20 microgrammes per cc. of chymotrypsin B. Since 1 cc. of N/10 sodium corresponds to 100 micromoles of hydrolysed acetyltyrosin ethyl ester, there are 7.250 mg. to 20 mg., i.e., since the percentage of proteins is 93% (18.6 mg. to 20 mg.), the specific activity is 390.

Pharmacological and therapeutic examination of the chymotrypsin B of the invention show that the compound is perfectly well tolerated by rabbits and rats, since animals which received two parenteral injections per day of an aqueous suspension as a dosage of 500 microgrammes per kg. for a period of 10 days, showed no anomaly at autopsy. The various organs of the animals were completely normal and no inflammation, lesion or even irritation was observed.

The behaviour of chymotrypsin B in gastric juice has been studied, and a clear superiority in stability over that of alpha-chymotrypsin observed.

Thus, chymotrypsin B was incubated in gastric juice at pH 2 at a temperature of 22–23° C. in a proportion of 1 mg./cc. of gastric juice, and after a predetermined time of incubation the number of specific units remaining in the gastric juice was measured.

In the case of chymotrypsin B obtained by the process of the invention, after incubation for half an hour, 205 units per mg. remained; after incubation for 1 hour, the same value was found; and after 1½ hours there were still 170 units per mg.

In contrast to this, when alpha-chymotrypsin was subjected to the same test, only 6 units per mg. remained after incubation for 1 hour. Moreover, it was shown that chymotrypsin B of the invention is less inhibited than alpha-chymotrypsin by pancreatic juice.

The chymotrypsin B according to the invention can be used as medicament in the conditions set forth below.

The preferred pharmaceutical forms may have the following compositions:

(A) Solutions to be injected:
    Chymotrypsin B (lyophilised flask) _____mg__ 5
    Isotonic solvent (ampuls) _____cc__ 5

Injections may be made, for instance and according to the case, once between 2 and 20 days.

(B) Sugar-coated tablets:                           Mg.
    Chymotrypsin B _____     5
    Excipient qs _____   100

(C) Ointments:
    Chymotrypsin B, 30,000 chymotrypsin [1] units, excipient qs, 20 gr.

[1] One chymotrypsin unit corresponds to 1 micromol of acetyltyrosine ethyl ester hydrolysed in 1 minute. The specific activity is the number of units per mg.

(D) Aerosols
(E) Suppositories

In clinical tests, the product of the invention administered by the parenteral route exhibited an appreciable effectiveness on localised oedema by egg white and generalised oedema by dextran.

Owing to the fact that the product of the invention is only slightly destroyed by gastric juice, it can be orally administered in bronchopulmonary infections, which has led to favourable results in about 80–90% of cases. The results were assessed by taking account of the characteristics of expectoration, daily volume, appearance (fluidity, purulence) and of the functional and general state of the patient.

It is thus possible to use the product for treating various infections such as traumatic lesions, thrombophlebitis, dermatological lesions, pelvic infections, respiratory infections, conjunctivitis, urinary infections and stomatological affections.

In all cases where the product has been used, it has been perfectly tolerated and has exhibited a double action: on the fluidisation of exudates, and on the inflammatory character of the phenomena.

In particular, detailed clinical tests of the chymotrypsin B according to the invention have been conducted.

Experiments have been made on 30 patients classified as hereunder indicated who have been treated with intramuscular injections of the solutions above mentioned, particularly with respect to the following affections:

(1) Rheumatismal affections — glenohumeral periarthritis, fibrous rheumatism, neurotrophic rheumatism.

A substantial improvement in the state of the patients so treated has been noticed.

(2) Bronchorrhea.

The improvement shown by patients so treated is unquestionable and is accompanied by an obvious diminution of expectoration and an improvement of the breathing functions.

(3) Medical oedema, varicose and phlebitic oedema.

For the treatment of these affections, the compound according to the inventions exhibited great effectiveness.

(4) Chirurgical oedema: post-traumatic and post fracture (in particular after removal of the retention plaster), edematous bruised wounds are successfully treated by administration of the compound according to the invention.

The product is very well tolerated and intramuscular injections are absolutely painless.

No local or hematologic reactions have been observed.

The compound according to the invention ensures the valuable treatment of glenohumeral periarthritis, if compared to the value of modern therapeutics in this field.

Interesting results have been obtained in the treatment of traumatismal thrombotic oedema and stasis oedema and in chronic bronchorrhea.

In the ointment form, the compound under the invention showed effectiveness in the following affections:

(1) Urology—Oedema of the penis after retaining catherer use,
(2) Dermatology—Eschars, scabs, scars, cheloids,
(3) Ophtalmology—Ocular infections of inflammatory origin,
(4) Stomatology — For preventing post-extractional oedema.

What I claim is:

1. A process for obtaining chymotrypsin B from an acidic extract of pancreatic material which comprises the steps:
    (1) addition of ammonium sulfate to said pancreatic extract to a concentration of about 15–25% weight-volume to precipitate inert material;
    (2) addition of ammonium sulfate after removal of inert material to a concentration of about 35–45% weight-volume to precipitate chymotrypsinogen B;
    (3) demineralization and further purification of chymotrypsinogen B by:
        (a) dissolving chymotrypsinogen B in water;
        (b) chromatographing aqueous solution at a pH of about 3.8;
        (c) eluting of inert material from chromatography column with a buffer of about pH 3.8; and
        (d) eluting chymotrypsinogen B with a buffer of about pH 4.6;
    (4) reprecipitation of chymotrypsinogen B from eluate by addition of ammonium sulfate;
    (5) activation of chymotrypsinogen B to chymotrypsin B by treatment with trypain at a pH of about 7.8;
    (6) demineralization and purification following the steps in step (3); and
    (7) isolation of chymotrypsin B by centrifugation and lyophilization, all of said steps being conducted at a temperature of about 0° C.

2. A process according to claim 1, wherein the chromatographing is effected on a column of carboxymethyl cellulose.

3. A process according to claim 1, wherein the activation step is carried out in the presence of calcium ions.

4. A process according to claim 1, wherein the temperature is −2° C.

References Cited

UNITED STATES PATENTS 2,758,055  8/1956  Maxwell et al. _____ 167—75
2,758,056  8/1956  Thompson et al. _____ 167—75

ALBERT T. MEYERS, *Primary Examiner.*

S. ROSEN, *Examiner.*

L. B. RANDALL, *Assistant Examiner.*